US012722411B2

(12) United States Patent
Harima et al.

(10) Patent No.: US 12,722,411 B2
(45) Date of Patent: Sep. 1, 2026

(54) HEAT-SENSITIVE RECORDING MEDIUM

(71) Applicant: OSAKA SEALING PRINTING CO., LTD., Osaka (JP)

(72) Inventors: Hidenobu Harima, Osaka (JP); Yusuke Egashira, Osaka (JP)

(73) Assignee: OSAKA SEALING PRINTING CO., LTD., Osaka (JP)

( * ) Notice: Subject to any disclaimer, the term of this patent is extended or adjusted under 35 U.S.C. 154(b) by 0 days.

(21) Appl. No.: 19/106,351

(22) PCT Filed: Aug. 25, 2023

(86) PCT No.: PCT/JP2023/030706
§ 371 (c)(1),
(2) Date: Feb. 25, 2025

(87) PCT Pub. No.: WO2024/048447
PCT Pub. Date: Mar. 7, 2024

(65) Prior Publication Data

US 2026/0001368 A1 Jan. 1, 2026

(30) Foreign Application Priority Data

Aug. 29, 2022 (JP) ................................ 2022-136378
Jan. 30, 2023 (JP) ................................ 2023-011961

(51) Int. Cl.
*B41M 5/333* (2006.01)
*B41M 5/337* (2006.01)
*B41M 5/46* (2006.01)

(52) U.S. Cl.
CPC ............ *B41M 5/46* (2013.01); *B41M 5/3333* (2013.01); *B41M 5/3375* (2013.01); *B41M 2205/04* (2013.01)

(58) Field of Classification Search
CPC .. B41M 5/323; B41M 5/3333; B41M 5/3375; B41M 5/46; B41M 2205/04
See application file for complete search history.

(56) References Cited

U.S. PATENT DOCUMENTS 10,780,724 B2 * 9/2020 Miyanaga ............ B41M 5/3333
11,945,769 B2 * 4/2024 Kinishi .................. B41M 5/323
(Continued)

FOREIGN PATENT DOCUMENTS

EP 2033801 A1 * 3/2009 .......... B41M 5/3333
JP S6315784 A 1/1988
(Continued)

OTHER PUBLICATIONS

Pubchem article on 2-ethoxy-2'-ethyloxanilide acquired from https://pubchem.ncbi.nlm.nih.gov/compound/90303 on Jan. 14, 2026.*
(Continued)

*Primary Examiner* — Gerard Higgins
(74) *Attorney, Agent, or Firm* — Osha Bergman Watanabe & Burton LLP

(57) ABSTRACT

The purpose of the present invention is to provide a heat-sensitive recording medium which hardly causes safety concerns such as endocrine disrupting chemicals, and is excellent in chromogenic properties and light resistance, and also excellent in heat resistance. A heat-sensitive recording medium (1) has a configuration in which a heat-sensitive recording layer (3) is layered on a substrate (2). The heat-sensitive recording layer (3) comprises a color former, a non-phenol-based developer, and a non-phenol-based ultraviolet absorber. The non-phenol-based ultraviolet absorber comprises an oxanilide-based ultraviolet absorber. Preferably, the non-phenol-based developer comprises a compound represented by the following formula (1) and/or a compound represented by the following formula (2).

(Continued)

[Formula 1]

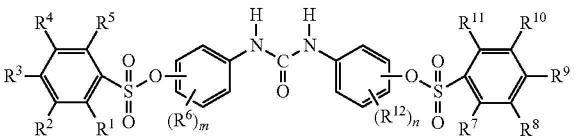

(1)

[Formula 2]

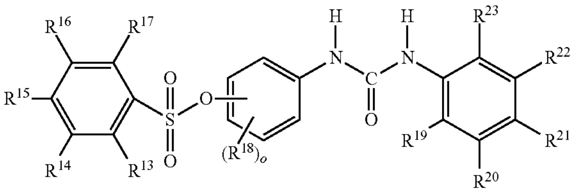

(2)

(The symbols in the formulae (1) and (2) are as defined in the specification.)

5 Claims, 1 Drawing Sheet

(56) References Cited

U.S. PATENT DOCUMENTS

| | | | | |
|---|---|---|---|---|
| 12,246,549 | B2 * | 3/2025 | Hirai | B41M 5/323 |
| 2001/0044553 | A1 * | 11/2001 | Kabashima | B41M 5/3333 560/163 |
| 2015/0284321 | A1 | 10/2015 | Sakai et al. | |
| 2020/0172477 | A1 | 6/2020 | Horn et al. | |

FOREIGN PATENT DOCUMENTS

| | | | |
|---|---|---|---|
| JP | H0995055 | A | 4/1997 |
| JP | 2001246849 | A | 9/2001 |
| JP | 2006110761 | A | 4/2006 |
| JP | 2009066897 | A | 4/2009 |
| JP | 2017177577 | A | 10/2017 |
| JP | 2018012270 | A | 1/2018 |
| JP | 2018134818 | A | 8/2018 |
| JP | 2020520833 | A | 7/2020 |
| JP | 2021100798 | A | 7/2021 |
| KR | 20100017680 | A | 2/2010 |
| KR | 20150065884 | A | 6/2015 |
| WO | 2021041600 | A2 | 3/2021 |

OTHER PUBLICATIONS

Decision to Grant a Patent issued in corresponding Japanese Application No. 2023-570132, mailed Jan. 9, 2024 (5 pages).

International Search Report issued in corresponding International Application No. PCT/JP2023/030706, mailed Oct. 31, 2023 (5 pages).

Written Opinion issued in corresponding International Application No. PCT/JP2023/030706, mailed Oct. 31, 2023 (3 pages).

Office Action issued in corresponding Korean Application No. 10-2025-7009256, dated Jun. 24, 2025 (10 pages).

Extended European Search Report issued in the counterpart European Application No. 23860209.8, mailed Jan. 19, 2026 (10 pages).

* cited by examiner

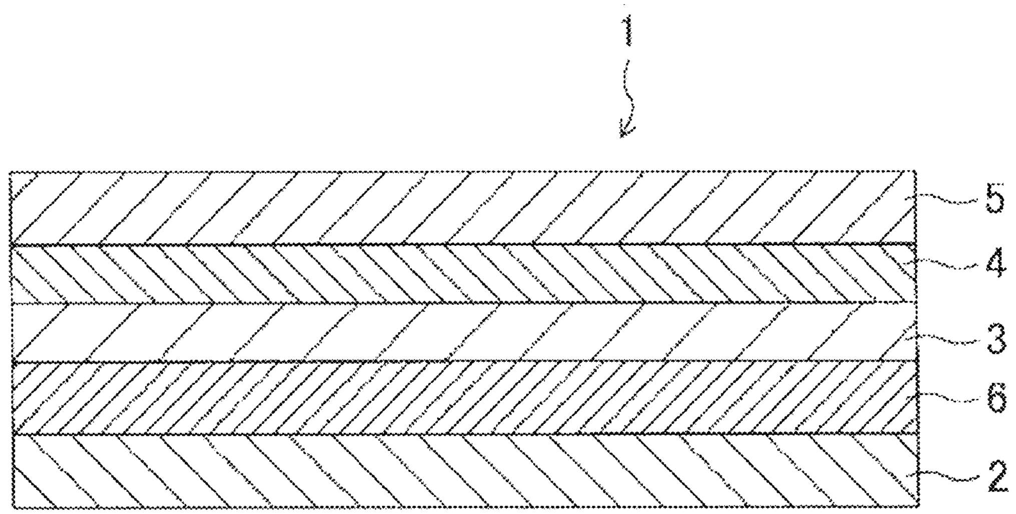
1
5
4
3
6
2

HEAT-SENSITIVE RECORDING MEDIUM

TECHNICAL FIELD

The present invention relates to a heat-sensitive recording medium, and more particularly to a heat-sensitive recording medium which hardly causes safety concerns, and is excellent in chromogenic properties, light resistance and heat resistance.

BACKGROUND ART

Heat-sensitive recording media develop a color through a chemical reaction upon heating of a thermal head or the like to obtain a recording image, and are used in a wide range of applications such as not only recording media for facsimiles, automatic ticket vending machines and scientific measurement machines but also heat-sensitive recording labels for POP systems and receipt paper in retail shops.

As described above, heat-sensitive recording media are widely used. Therefore, heat-sensitive recording media are required to have various kinds of performance. For example, chromogenic properties are required which ensure that when a barcode is read with a barcode reader, the reading with the barcode reader is performed with good accuracy. In addition, a characteristic is required which ensures that a heat-sensitive recording medium is unlikely to turn yellow when the heat-sensitive recording medium is exposed for a long time to intense light including an ultraviolet ray (light resistance). Further, excellent heat resistance is required which ensures that even in heating in a microwave oven or the like, a non-print portion is unlikely to develop a color while the chromogenic properties of a print portion are not deteriorated.

As such a heat-sensitive recording medium, for example, a heat-sensitive recording medium has been proposed in which a heat-sensitive recording layer containing a colorless or light-colored electron-donating leuco dye and an electron-accepting developer is provided on a support, wherein the heat-sensitive recording layer comprises, as the developer, a phenol-based developer such as 4-hydroxy-4'-isopropoxy-diphenylsulfone, and comprises, as an ultraviolet absorber, a phenol-based ultraviolet absorber having a phenolic hydroxyl group, such as 2-(3'-t-butyl-2'-hydroxy-5'-methylphenyl)-5-chlorobenzotriazole (see, for example, Patent Literature 1 to 3).

CITATION LIST

Patent Literature

Patent Literature 1: Japanese Patent Laid-Open No. 2009-066897

Patent Literature 2: Japanese Patent Laid-Open No. 2018-134818

Patent Literature 3: Japanese Patent Laid-Open No. 2017-177577

SUMMARY OF INVENTION

Technical Problem

Compounds having a phenolic hydroxyl group (phenol-based compounds), such as phenol-based developers and ultraviolet absorbers used in Patent Literature 1 to 3 above cause safety concerns as endocrine disrupting chemicals. Therefore, in recent years, heat-sensitive recording media with additives such as a developer and an ultraviolet absorber, which having no phenol skeleton, are required from the viewpoint of environmental compatibility.

The present invention has been made in view of these circumstances, and an object of the present invention is to provide a heat-sensitive recording medium which hardly causes safety concerns such as endocrine disrupting chemicals, and is excellent in chromogenic properties and light resistance, and also excellent in heat resistance.

Solution to Problem

The inventors of the present application have conducted intensive studies for achieving the above-described object, and resultantly found that when a developer having no phenol skeleton (non-phenol-based developer) and a specific ultraviolet absorber having no phenol skeleton (non-phenol-based ultraviolet absorber) are blended in a heat-sensitive recording layer, it is possible to provide a heat-sensitive recording medium which hardly causes safety concerns such as endocrine disrupting chemicals, and is excellent in chromogenic properties and light resistance, and also excellent in heat resistance. The present invention has been completed on the basis of the findings.

That is, an aspect of the present invention provides a heat-sensitive recording medium in which a heat-sensitive recording layer is layered on a substrate. In the heat-sensitive recording medium of the present invention, the heat-sensitive recording layer comprises a color former, a non-phenol-based developer, and a non-phenol-based ultraviolet absorber.

Conventional heat-sensitive recording media typically comprise phenol-based compounds as a developer and an ultraviolet absorber. However, the phenol-based compounds cause safety concerns as endocrine disrupting chemicals.

In contrast, in the heat-sensitive recording medium of the present invention, the developer and the ultraviolet absorber contained in the heat-sensitive recording layer are non-phenol-based compounds. Therefore, the above-described concerns do not arise. In addition, the heat-sensitive recording medium of the present invention is excellent in chromogenic properties, light resistance and heat resistance even though the above-described non-phenol-based compounds are used.

In the heat-sensitive recording medium of the present invention, the non-phenol-based ultraviolet absorber comprises an oxanilide-based ultraviolet absorber. By this, heat resistance can be particularly improved.

In an embodiment of the heat-sensitive recording medium of the present invention, the non-phenol-based developer preferably comprises a compound represented by the following formula (1) and/or a compound represented by the following formula (2).

[Formula 1]

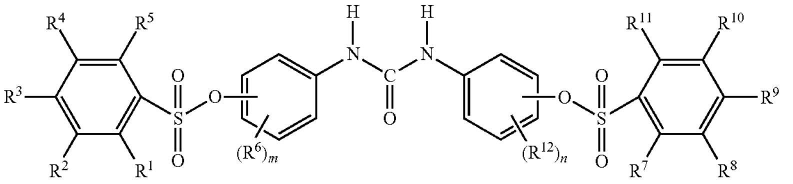

(1)

(In formula (1), $R^1$, $R^2$, $R^3$, $R^4$, $R^5$, $R^7$, $R^8$, $R^9$, $R^{10}$ and $R^{11}$ each independently represent a hydrogen atom, or a substituent. $R^6$ and $R^{12}$ each independently represent a substituent. m represents an integer of 0 to 4. When m is 2 or more, a plurality of $R^6$ may be the same or different. n represents an integer of 0 to 4. When n is 2 or more, a plurality of $R^{12}$ may be the same or different.)

[Formula 2]

(2)

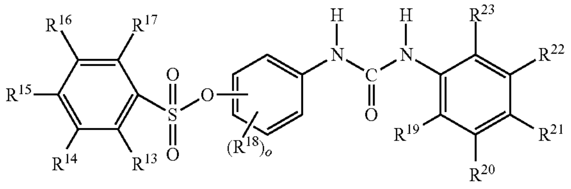

(In formula (2), $R^{13}$, $R^{14}$, $R^{15}$, $R^{16}$, $R^{17}$, $R^{19}$, $R^{20}$, $R^{21}$, $R^{22}$ and $R^{23}$ each independently represent a hydrogen atom, or a substituent. $R^{18}$ represents a substituent. o represents an integer of 0 to 4. When o is 2 or more, a plurality of $R^{18}$ may be the same or different.)

In an embodiment of the heat-sensitive recording medium of the present invention, the non-phenol-based developer preferably comprises a compound represented by the following formula (1a) and/or a compound represented by the following formula (2a).

[Formula 3]

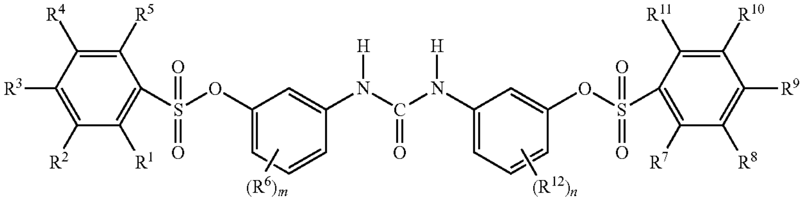

(1a)

(The symbols in formula (1a) are the same as in formula (1).)

[Formula 4]

(2a)

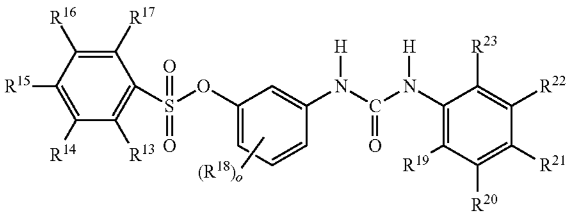

(The symbols in formula (2a) are the same as in formula (2).)

This configuration enables the provision of a heat-sensitive recording medium that is further excellent in chromogenic properties and heat resistance.

In another embodiment of the heat-sensitive recording medium of the present invention, the content of the non-phenol-based developer is preferably not less than 10 mass % and not more than 50 mass % with respect to the entirety of the heat-sensitive recording layer. This configuration enables the provision of a heat-sensitive recording medium that is excellent in chromogenic properties, and excellent in heat resistance.

In another embodiment of the heat-sensitive recording medium of the present invention, the content of the non-phenol-based ultraviolet absorber is preferably not less than 5 mass % and not more than 15 mass % with respect to the entirety of the heat-sensitive recording layer. This configuration enables the provision of a heat-sensitive recording medium that is excellent in chromogenic properties and heat resistance and excellent in light resistance even though a non-phenol-based ultraviolet absorber is used.

Advantageous Effect of Invention

According to the present invention, it is possible to provide a heat-sensitive recording medium which hardly causes safety concerns such as endocrine disrupting chemicals, and is excellent in chromogenic properties and light resistance, and excellent in heat resistance.

BRIEF DESCRIPTION OF DRAWING

FIG. 1 is a schematic sectional view showing an embodiment of a heat-sensitive recording medium of the present invention.

DESCRIPTION OF EMBODIMENTS

A heat-sensitive recording medium of the present invention has a layered structure in which a heat-sensitive recording layer is layered on a substrate. In the heat-sensitive recording medium of the present invention, the heat-sensitive recording layer comprises a color former, a non-phenol-based developer, and a non-phenol-based ultraviolet absorber. The non-phenol-based ultraviolet absorber comprises an oxanilide-based ultraviolet absorber.

Hereinafter, an embodiment of the heat-sensitive recording medium of the present invention will be described in detail with reference to the drawings, but the present invention is not limited to the following embodiments.

FIG. 1 is a schematic sectional view showing an embodiment of the heat-sensitive recording medium of the present invention.

A heat-sensitive recording medium 1 according to the present embodiment has a layered structure in which an undercoat layer 6, a heat-sensitive recording layer 3, an intermediate layer 4 and a topcoat layer 5 are layered in the stated order on a sheet-shaped substrate 2 as shown in FIG. 1.

In the present embodiment, the substrate 2 functions as a support for the heat-sensitive recording medium 1. As the substrate 2, for example, papers such as high-quality paper, art paper, coated paper, craft paper, and laminated paper obtained by laminating a thermoplastic resin such as polyethylene to a substrate from any of the foregoing papers, synthetic paper, and porous materials such as nonwoven fabrics can be used. In addition, transparent synthetic resin films, for example, polypropylene films, polyethylene terephthalate films, polystyrene films and polycarbonate films can be used. The thickness of the substrate 2 is not limited, and the substrate 2 with a thickness of about 10 μm to about 100 μm is prepared, the substrate 2 excellent in coating properties is obtained. In addition, the substrate 2 excellent in transparency is obtained.

In the present embodiment, the undercoat layer 6 has functions such as heat insulating properties for preventing diffusion of heat given from a thermal head, and cushioning properties. The undercoat layer 6 is formed by, for example, adding hollow particles as a filler to a binder.

By providing the heat-sensitive recording medium 1 with the undercoat layer 6 having heat resistance as described above, the sensitivity of print is improved. Therefore, an increase in applied voltage of the thermal head can be suppressed, and as a result, attachment to the thermal head by burning can be suppressed.

The average particle diameter of the hollow particles added as a filler to the undercoat layer 6 is preferably 1 μm to 100 μm. When average particle diameter of the hollow particles is in this range, the heat insulating properties of the undercoat layer 6 are improved. Here, the average particle diameter is a weigh average particle diameter measured by laser diffractometry. Measurement of the average particle diameter by laser diffractometry can be performed using, for example, "MT3300EX-II" (brand name) manufactured by MicrotracBEL Corporation.

The hollow ratio of the hollow particles is preferably 30% to 99%. When the hollow ratio of the hollow particles is in this range, the heat insulating properties of the undercoat layer 6 are improved. The larger the hollow ratio of the hollow particles, the higher the heat insulation effect. Therefore, the color former can effectively develop a color with a small amount of heat. That is, increasing the hollow ratio improves the print quality of the heat-sensitive recording medium 1.

Here, the hollow ratio of the hollow particle is calculated by the following equation.

$$\text{Hollow ratio} = \{(\text{volume of voids})/(\text{volume of hollow particles})\} \times 100$$

The content ratio of hollow particles in the undercoat layer 6 is preferably 40 parts by mass to 90 parts by mass per 100 parts by mass of the undercoat layer.

The material for forming the hollow particles is, for example, a thermoplastic resin. Examples of the thermoplastic resin include polystyrene-base resins, polyvinyl chloride-based resins, polyvinylidene chloride-based resins, polyvinyl acetate-based resins, polyacrylic acid ester-based resins, polyacrylonitrile-based resins, and polybutadiene-based resins.

As the filler for the undercoat layer 6, a filler other than hollow particles may be used. Examples thereof include fired kaolin, aluminum oxide, aluminum silicate, heavy calcium carbonate, light calcium carbonate, titanium oxide, barium sulfate, silica gel, activated white earth, talc, clay, kaolinite, diatomaceous earth, white carbon, magnesium carbonate, magnesium oxide, magnesium hydroxide, zinc oxide, polystyrene resin particles, urea-formalin resin particles, and polyolefin resin particles. These fillers can be used alone, or in combination of two or more thereof.

Examples of the binder contained in the undercoat layer 6 include acryl-styrene copolymers, styrene-butadiene copolymers, acryl-butadiene-styrene copolymers, vinyl acetate resins, vinyl acetate-acrylic acid copolymers, styrene-acrylic acid ester copolymers, acrylic acid ester-based resins, and polyurethane-based resins.

As the binder, water-soluble polymers such as polyvinyl alcohol, starch and derivatives thereof, cellulose derivatives such as methoxycellulose, hydroxyethylcellulose, carboxymethylcellulose, methylcellulose and ethylcellulose, sodium polyacrylate, polyvinylpyrrolidone, acrylamide-acrylic acid ester copolymers, acrylamide-acrylic acid ester-methacrylic acid terpolymers, styrene-maleic anhydride copolymer alkali salts, isobutylene-maleic anhydride copolymer alkali salts, polyacrylamide, sodium alginate, gelatin, and casein may be used.

The application amount (dry weight) of the undercoat layer 6 is preferably 1 $g/m^2$ to 10 $g/m^2$.

The thickness of the undercoat layer 6 is preferably 1 μm to 20 μm.

When the undercoat layer 6 is prepared such that its application amount and thickness are in the above-described ranges, the undercoat layer 6 appropriately exhibits a heat insulating function.

In the present embodiment, the heat-sensitive recording layer 3 is a layer which develops a color through a chemical reaction upon heating of a thermal head or the like to form a recording image on the heat-sensitive recording medium 1. In the present embodiment, the heat-sensitive recording layer 3 comprises a color former, a non-phenol-based developer, and a non-phenol-based ultraviolet absorber.

Regarding the color former, the color former which develops a color upon heating is a component which develops a color through a chemical reaction upon heating of a thermal head or the like to form a recording image on the heat-sensitive recording medium 1 of the present embodiment. As the color former which develops a color upon heating, a commonly used known leuco-base dye can be used. Examples of the leuco-based dye include 3-(N-isobutyl-N-ethyl)amino-6-methyl-7-anilinofluoran, 3-(N-isopentyl-N-ethyl)amino-6-methyl-7-o-chloroanilinofluoran, 3-(N-methyl-N-p-toluidino)-6-methyl-7-anilinofluoran, 3-(N-ethyl-N-p-toluidino)-6-methyl-7-anilinofluoran, 3-(N-ethyl-N-isopentyl)amino-6-methyl-7-anilinofluoran, 3-(N-ethoxypropyl-N-ethyl)amino-6-methyl-7-anilinofluoran, 3-(N-cyclohexyl-N-methyl)amino-6-methyl-7-anilinofluoran, 3-(N-methyl-N-n-propyl)amino-6-methyl-7-anilinofluoran, 3-dibutylamino-6-methyl-7-anilinofluoran, 3-diethylamino-6-methyl-7-p-toluidinofluoran, 3-diethylamino-6-methyl-7-anilinofluoran, 3-diethylamino-6-methyl-8-methylfluoran, 3-diethylamino-7-(m-trifluoromethylanilino) fluoran, 3-diethylamino-7-(o-chloroanilino) fluoran, 3-diethylamino-7-chlorofluoran, 3-dibutylamino-6-methyl-7-bromofluoran, 3-dibutylamino-7-(o-chloroanilino) fluoran, 3-dipentylamino-6-methyl-7-anilinofluoran, 3-dimethylamino-5-methyl-7-methylfluoran, 3-pyrrolidino-6-methyl-7-anilinofluoran, and crystal violet lactone. These leuco-based dyes can be used alone, or in combination of two or more thereof.

The particle diameter of the color former is preferably 0.1 to 1.0 μm. Since the color former melts and reacts, the larger the particle diameter, the slower the reaction and the lower the sensitivity characteristic. On the other hand, the smaller the particle diameter, the higher the risk that heat used to dry the paint causes color development at an unexpected temperature. In the present embodiment, the particle diameter of the color former is set within the above-described range, and thus, the sensitivity characteristic and the color development temperature of the color former can be appropriately adjusted. Here, the particle diameter is an average particle diameter at 50% in measurement with a Microtrac Laser Diffraction and Scattering Particle Size Analyzer.

In the present embodiment, the color former is preferably contained in an amount of about 10 to 20 mass % with respect to the entirety of the heat-sensitive recording layer 3 for obtaining excellent chromogenic properties. The later-described developer is preferably contained in an amount of 1 to 3 parts per one part of the color former on a dry weight basis.

In the present embodiment, the heat-sensitive recording layer 3 comprises a non-phenol-based developer as opposed to a phenol-based developer that has been commonly used heretofore. The non-phenol-based developer, which is among various electron-accepting substances that react with the above-described leuco-based dye to make the leuco-based dye develop a color, is a compound having no phenolic hydroxyl group. The configuration in which the heat-sensitive recording layer 3 comprises a non-phenol-based developer is rephrased as "a phenol-based developer which may threaten safety as an endocrine disrupting chemical is not used with purpose". In the present embodiment, the heat-sensitive recording layer 3 comprises a non-phenol-based developer as opposed to a phenol-based developer, and thus, a leuco-based dye can be made to develop a color with efficiency. The heat-sensitive recording layer 3 may inevitably comprise, as an impurity or the like, a phenol-based compound in an amount small enough not to cause safety concerns as endocrine disrupting chemicals. The heat-sensitive recording layer 3, with such a minute amount of a phenol-based compound, is within the scope of the present invention.

As the non-phenol-based developer, known developers having no phenolic hydroxyl group can be used without limitation, and examples thereof include 2,2-bis[(4-methyl-3-phenoxycarbonylaminophenyl) urea]diphenylsulfone, 4,4'-bis(p-trisulfonylaminocarbonylamino)diphenylmethane, 2'-(3-phenylureido)benzenesulfonanilide, and N-(p-toluenesulfonyl)-N'-(3-p-toluenesulfonyloxyphenyl) urea.

Here, as the developer, the above-described non-phenol-based developers can also be used. However, the present inventors have found that compounds represented by the following formula (1) and the following formula (2) are preferred from the viewpoint of further improving the heat resistance of the heat-sensitive recording medium 1.

[Formula 5]

(1)

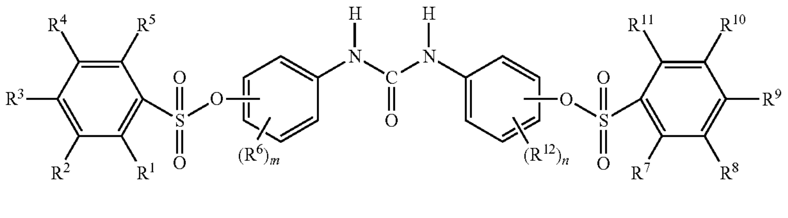

(In formula (1), $R^1$, $R^2$, $R^3$, $R^4$, $R^5$, $R^7$, $R^8$, Ro, $R^{10}$ and $R^{11}$ each independently represent a hydrogen atom, or a substituent. $R^6$ and $R^{12}$ each independently represent a substituent. m represents an integer of 0 to 4. When m is 2 or more, a plurality of $R^6$ may be the same or different. n represents an integer of 0 to 4. When n is 2 or more, a plurality of $R^{12}$ may be the same or different.)

[Formula 6]

(2)

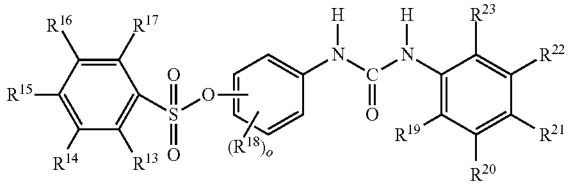

(In formula (2), $R^{13}$, $R^{14}$, $R^{15}$, $R^{16}$, $R^{17}$, $R^{19}$, $R^{20}$, $R^{21}$, $R^{22}$ and $R^{23}$ each independently represent a hydrogen atom, or a substituent. $R^{18}$ represents a substituent. o represents an integer of 0 to 4. When o is 2 or more, a plurality of $R^{18}$ may be the same or different.)

As the "substituent", organic groups other than a hydrogen atom can be used without limitation, and examples thereof include a halogen atom, a nitro group, an amino group, an alkyl group, an alkoxy group, an aryl group, an aryloxy group, an alkylcarbonyloxy group, an alkylcarbonylamino group, an arylcarbonylamino group, an alkylsulfonylamino group, an arylsulfonylamino group, a monoalkylamino group, a dialkylamino group, and an arylamino group.

Examples of the "halogen atom" include a fluorine atom, a chlorine atom, a bromine atom, and a iodine atom.

Examples of the "alkyl (group)" include linear or branched alkyl groups having 1 to 12 carbon atoms, such as a methyl group, an ethyl group, a normal propyl group, an isopropyl group, a normal butyl group, an isobutyl group, a secondary butyl group, a tertiary butyl group, a normal pentyl group, an isopentyl group, a tertiary pentyl group, a neopentyl group, a 2,3-dimethylpropyl group, a 1-ethylpropyl group, a 1-methylbutyl group, a 2-methylbutyl group, a normal hexyl group, an isohexyl group, a 2-hexyl group, a 3-hexyl group, a 2-methylpentyl group, a 3-methylpentyl group, a normal heptyl group, a normal octyl group, a normal nonyl group, a normal decyl group, a normal undecyl group and a normal dodecyl group.

Examples of the "alkoxy group" include linear or branched alkoxy groups having 1 to 8 carbon atoms, such as a methoxy group, an ethoxy group, a normal propoxy group, an isopropoxy group, a normal butoxy group, a secondary butoxy group, a tertiary butoxy group, a normal pentyloxy group, an isopentyloxy group, a tertiary pentyloxy group, a neopentyloxy group, a 2,3-dimethylpropyloxy group, a 1-ethylpropyloxy group, a 1-methylbutyloxy group, a normal hexyloxy group, an isohexyloxy group, a normal heptyloxy group and a normal octyloxy group.

Examples of the "aryl (group)" include aromatic hydrocarbon groups having 6 to 10 carbon atoms, such as a phenyl group, a 1-naphthyl group and a 2-naphthyl group.

In the "dialkylamino group", the two alkyl groups may be the same or different.

The compound represented by formula (1) is preferably a compound represented by the following formula (1a) from the viewpoint of being able to impart excellent chromogenic properties and heat resistance to the heat-sensitive recording medium 1. Specific examples thereof include N,N'-di-[3-(p-toluenesulfonyloxy)phenyl]urea represented by the following formula (1b), N,N'-di-[3-(p-xylenesulfonyloxy)phenyl] urea, N,N'-di-[3-(p-mesitylenesulfonyloxy)phenyl]urea, N,N'-di-[3-(0-toluenesulfonyloxy)phenyl]urea, N,N'-di-[3-(m-toluenesulfonyloxy)phenyl]urea, and N,N'-di-[3-(benzenesulfonyloxy)phenyl]urea.

[Formula 7]

(1a)

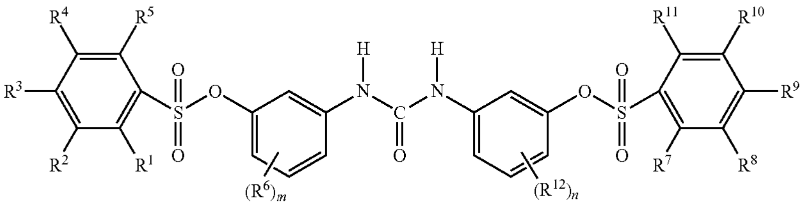

(The symbols in formula (1a) are the same as in formula (1).)

[Formula 8]

(1b)

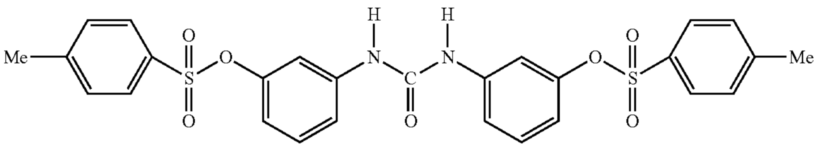

The compound represented by formula (2) is preferably a compound represented by the following formula (2a) from the viewpoint that excellent chromogenic properties and heat resistance can be imparted to the heat-sensitive recording medium 1. Specific examples thereof include [3-(3-phenylureido)phenyl]-4-methylbenzene sulfonate represented by the following formula (2b).

[Formula 9]

(2a)

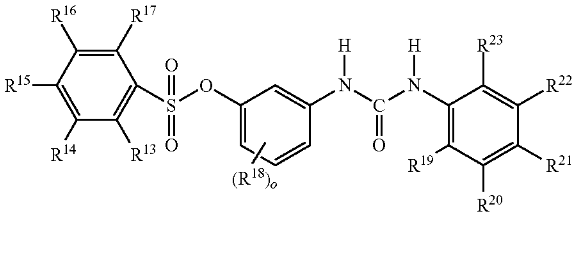

(The symbols in formula (2a) are the same as in formula (2).)

[Formula 10]

(2b)

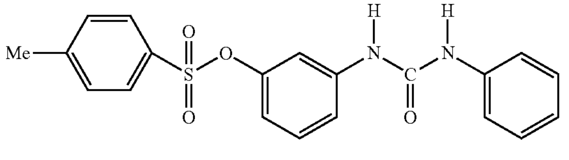

In the present embodiment, the heat-sensitive recording layer 3 may comprise a single non-phenol-based developer, or two or more non-phenol-based developers.

When as the non-phenol-based developer, at least one, or both of a compound represented by the formula (1) and a compound represented by the formula (2) are used for the heat-sensitive recording layer 3, it is possible to improve the heat resistance and chromogenic properties of the heat-sensitive recording medium 1.

In the present embodiment, the content of the non-phenol-based developer is preferably not less than 10 mass % and not more than 50 mass % with respect to the entirety of the heat-sensitive recording layer 3. The configuration in which the content of the non-phenol-based developer is 10 mass % or more is preferable from the viewpoint of being able to prevent a decline in chromogenic properties (a decrease in optical density) due to deficiency of the developer. The configuration in which the content of the non-phenol-based developer is 50 mass % or less is preferable from the viewpoint of preventing a decline in chromogenic properties (a decrease in optical density) due to excess of the developer (that is, deficiency of the dye).

In the present embodiment, as described above, a phenol-based developer is not used with purpose as a developer for the heat-sensitive recording layer 3, but a minute amount of a phenol-based compound may be inevitably contained as an impurity from the non-phenol-based developer, or the like. Examples of the impurity include compounds formed by hydrolysis of all or a part of sulfonic acid esters ($—SO_2—O—$) and alkoxy groups, aryloxy groups, alkylcarbonyloxy groups and the like contained as substituents, in non-phenol-based developers represented by the formulae (1) and/or (2). Such a phenol-based compound contained as an impurity can function as a developer.

In the present embodiment, the phenol-based compound that can be inevitably contained as an impurity in the heat-sensitive recording layer 3 can be contained in, for example, an instrumentally detectable amount of ppm order (for example, about 100 ppm or less with respect to the entirety of the heat-sensitive recording layer 3), but it is considered that such a minute amount does not lead to safety concerns such as endocrine disrupting chemicals, and derives substantially no function as a developer.

In the present embodiment, the heat-sensitive recording layer 3 comprises a non-phenol-based ultraviolet absorber as opposed to a phenol-based ultraviolet absorber that has been commonly used heretofore. The non-phenol-based ultraviolet absorber, which is a substance that absorbs ultraviolet rays, is a compound having no phenolic hydroxyl group. The configuration in which the heat-sensitive recording layer 3 comprises a non-phenol-based ultraviolet absorber is rephrased as "a phenol-based developer which may threaten safety as an endocrine disrupting chemical is not used with purpose". In the present embodiment, the heat-sensitive recording layer 3 comprises a non-phenol-based ultraviolet absorber as opposed to a phenol-based ultraviolet absorber, and thus, the light resistance and the heat resistance of the heat-sensitive recording medium 1 can be improved. The heat-sensitive recording layer 3 according to the present embodiment, with a phenol-based ultraviolet absorber at a level such that safety concerns as endocrine disrupting chemicals do not arise, and chromogenic properties, light resistance and heat resistance are not influenced, is also within the scope of the present invention.

As the non-phenol-based ultraviolet absorber, known ultraviolet absorbers having no phenolic hydroxyl group can be used without limitation. Examples thereof include oxanilide-based ultraviolet absorbers. The inventors of the present application have found that compounds represented by the following formula (3) are preferred from the viewpoint of further improving the light resistance and the heat resistance of the heat-sensitive recording medium 1.

[Formula 11]

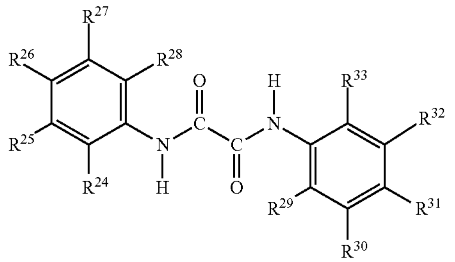

(3)

(In formula (3), $R^{24}$, $R^{25}$, $R^{26}$, $R^{27}$, $R^{28}$, $R^{29}$, $R^{30}$, $R^{31}$, $R^{32}$ and $R^{33}$ each independently represent a hydrogen atom, or a substituent.)

In formula (3), the definitions and examples of substituents $R^{24}$ to $R^{33}$ are the same as in formula (1).

Specific examples of the compound represented by formula (3) include oxalic acid bisanilide, 2-ethoxy-2'-ethyloxalic acid bisanilide, (N-(2-ethoxyphenyl)-N'-(2-ethylpheny)ethanediamide), 2-ethoxy-5-t-butyl-2'-ethyloxalic acid bisanilide, and 2-ethoxy-3'-dodecyloxalic acid bisanilide. In the present embodiment, the heat-sensitive recording layer 3 may comprise a single non-phenol-based ultraviolet absorber, and two or more non-phenol-based ultraviolet absorbers.

In the present embodiment, the content of the non-phenol-based ultraviolet absorber with respect to the entirety of the heat-sensitive recording layer 3 is not limited, but is preferably not less than 5 mass % and not more than 15 mass %. The configuration in which the content of the non-phenol-based ultraviolet absorber is 5 mass % or more is preferred from the viewpoint of being able to impart excellent light resistance to the heat-sensitive recording medium 1 according to the present embodiment. The configuration in which the content of the non-phenol-based ultraviolet absorber is 15 mass % or less is preferred from the viewpoint of being able to impart excellent chromogenic properties to the heat-sensitive recording medium 1 according to the present embodiment.

In the present embodiment, the content of the non-phenol-based ultraviolet absorber with respect to the total amount of ultraviolet absorbers contained in the heat-sensitive recording layer 3 is not limited, but is preferably 90 mass % or more, more preferably 95 mass % or more, and further more preferably 99 mass % or more, from the viewpoint of improving light resistance and heat resistance while reducing safety concerns such as endocrine disrupting chemicals.

In the present embodiment, the content of the oxanilide-based ultraviolet absorber with respect to the total amount of ultraviolet absorbers contained in the heat-sensitive recording layer 3 is not limited, but is preferably 90 mass % or more, more preferably 95 mass % or more, and further more preferably 99 mass % or more, from the viewpoint of improving light resistance and heat resistance while reducing safety concerns such as endocrine disrupting chemicals.

The heat-sensitive recording layer 3 may appropriately comprise additives such as a binder, a sensitizer, a slipping agent, a filler, a storage stability improver and a pigment as necessary.

Examples of the binder contained in the heat-sensitive recording layer 3 include polyvinyl alcohol, modified polyvinyl alcohol, starch, casein, gelatin, polyamide, polyacrylamide, modified polyacrylamide, hydroxyethylcellulose, methylcellulose, carboxymethylcellulose, hydroxypropylcellulose, polyvinyl acetate, polyacrylic acid esters, styrene-maleic anhydride copolymers, isobutylene-maleic anhydride copolymers, diisobutylene-maleic anhydride copolymers, vinyl acetate-maleic anhydride copolymers, methylvinyl-maleic anhydride copolymers, isopropylene-maleic anhydride copolymers, styrene-butadiene copolymers, polyvinyl chloride, polyvinylidene chloride, vinyl chloride-vinyl acetate copolymers, polyurethane, polystyrene, polyvinylpyrrolidone, acrylic acid esters, acrylonitrile, and methyl vinyl ether. These binders can be used alone, or in combination of two or more thereof.

Examples of the sensitizer include those that are solid at room temperature, and preferably have a melting point of 70° C. or higher, such as stearic acid, stearic acid amide, stearanilide, methylolstearic acid amide, methylenebisstearic acid amide, ethylenebisstearic acid amide, 1-benzyloxynaphthalene, 2-benzyloxynaphthalene, 2,6-diisopropylnaphthalene, 1,2-diphenoxyethane, 1,2-diphenoxymethylbenzene, 1,2-bis(3,4-dimethylphenyl) ethane, 1,2-bis(3-methylphenoxy)ethane, 1,2-bis(4-methylphenoxy)ethane, di(p-chlorobenzyl) oxalate, di(p-methylbenzyl) oxalate, dibenzyl oxalate, p-benzylbiphenyl, m-terphenyl, diphenylsulphone, benzyl p-benzyloxybenzoate, dibenzyl terephthalate and p-toluenesulfonamide. These sensitizers can be used alone, or in combination of two or more thereof.

Examples of the slipping agent include paraffin wax, fatty acids such as oleic acid, polyolefin waxes such as polyethylene wax, metallic soaps such as zinc stearate, ester waxes such as carnauba wax, oils such as silicone oil and whale oil. These slipping agents can be used alone, or in combination of two or more thereof.

Examples of the filler include aluminum hydroxide, magnesium hydroxide, aluminum oxide, magnesium oxide, aluminum silicate, calcium carbonate, magnesium carbonate, titanium oxide, barium sulfate, silica gel, activated white earth, talc, clay, kaolin, fired kaolin, diatomaceous earth, white carbon, zinc oxide, silicon oxide, colloidal silica, polystyrene resin particles, urea-formalin resin particles, and polyolefin resin particles. These fillers can be used alone, or in combination of two or more thereof.

Examples of the storage stability improver include sodium-2,2'-methylenebis(4,6-di-t-butylphenyl) phosphite, 4,4-butylidenebis(3-methyl-6-t-butylphenol), 1,1,3-tris(2-methyl-4-hydroxy-5-t-butylphenyl) butane, 1,1,3-tris(2-methyl-4-hydroxy-5-cyclohexylphenyl) butane, tris(2,6-dimethyl-4-t-butyl-3-hydroxybenzyl) isocyanurate, 4-(2-methylglycyloxy)-4'-benzyloxydiphenylsulfone, 2,2'-methylenebis(4-methyl-6-t-butylphenol), 2,2'-methylenebis (4-ethyl-6-t-butylphenol), diethylthiourea, zinc dibutyldithiocarbamate, 4,4'-thiobis(6-t-butyl-m-cresol), and a urea-urethane compound represented by the following formula (4).

[Formula 12]

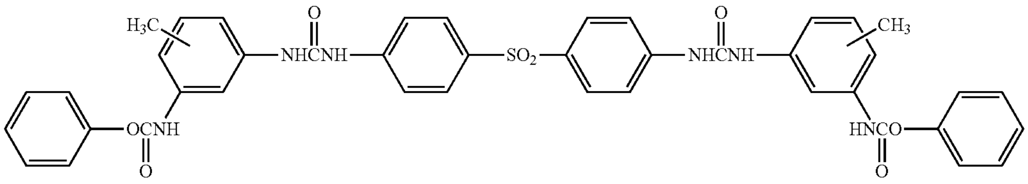

(4)

These storage stability improvers can be used alone, or in combination of two or more thereof. The storage stability improver may comprise a known surfactant.

Fresh foods such as meat and fish are sold in the form of a pack wrapped in a plastic warp, on which a label indicating a price and the like is attached. The packs are typically laid out in a stack, and therefore, a label may come into contact with a plastic wrap in which another pack is wrapped. The plastic wrap comprises a plasticizer for imparting plasticity. If packs are left to stand in a stack for a long time, the plasticizer may transfer to the label, and affect the print. Therefore, the heat-sensitive recording medium is preferably excellent in characteristic that the print is unlikely to disappear even if the plasticizer transfers, that is, "plasticizer resistance".

In the present embodiment, the heat-sensitive recording layer 3 preferably comprises a storage stability improver, and particularly preferably comprises a urea-urethane compound represented by the formula (4), from the viewpoint of print storage stability, in particular, plasticizer resistance.

It is considered that when the heat-sensitive recording layer 3 comprises a storage stability improver, in particular, a urea-urethane compound represented by formula (4), the efficiency of reaction between a leuco-based dye and a developer is enhanced, an electron transfer complex is easily formed, and a reverse reaction is unlikely to occur, so that the heat-sensitive recording medium has excellent chromogenic properties, is unlikely to undergo a decrease in color optical density, and is excellent in print storage stability, in particular, plasticizer resistance.

The urea-urethane compound represented by formula (4) includes specifically three types of compounds represented by the following formulae (4a) to (4c), which can be used alone, or in mixture of two or more thereof.

[Formula 13]

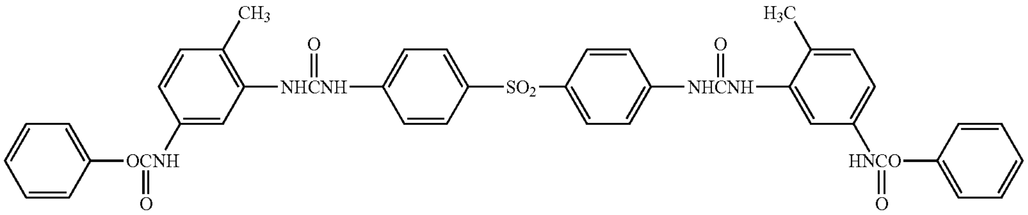

(4a)

[Formula 14]

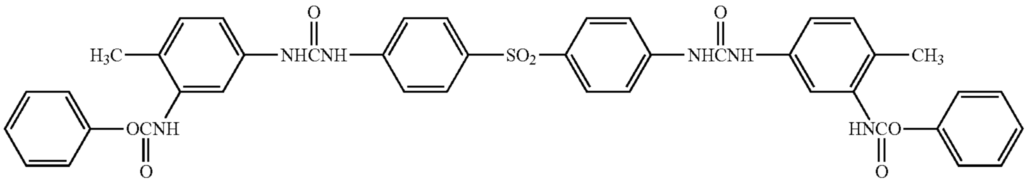

(4b)

[Formula 15]

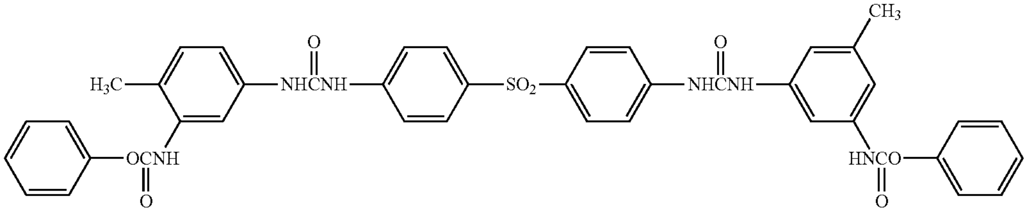

(4c)

In the present embodiment, when the heat-sensitive recording layer 3 comprises a storage stability improver, the content of the storage stability improver is preferably not less than 1 mass % and not more than 20 mass % with respect to the entirety of the heat-sensitive recording layer 3. The configuration in which the content of the storage stability improver is 1 mass % or more is preferable from the viewpoint of being able to suppress a decrease in the color optical density by a plasticizer or the like, and improving print storage stability, in particular, plasticizer resistance. The configuration in which the content of the storage stability improver is 20 mass % or less is preferable from the viewpoint of preventing a decline in chromogenic properties (a decrease in optical density).

In the present embodiment, when the heat-sensitive recording layer 3 comprises a storage stability improver, the content ratio of the storage stability improver to the non-phenol-based developer (storage stability improver/non-phenol-based developer) is preferably 1/20 to 1/1. The configuration in which the content ratio is 1/1 or less is preferable from the viewpoint of being able to prevent a decline in chromogenic properties (a decrease in optical density). The configuration in which the content ratio is 1/20 or more is preferable from the viewpoint of being able to suppress a decrease in the color optical density by a plasticizer or the like, and improving print storage stability, in particular, plasticizer resistance.

In the present embodiment, the heat-sensitive recording layer 3 comprises a urea-urethane compound represented by formula (4), the content of the urea-urethane compound represented by formula (4) is preferably not less than 1 mass % and not more than 20 mass % with respect to the entirety of the heat-sensitive recording layer 3. The configuration in which the content of the urea-urethane compound is 1 masse or more is preferable from the viewpoint of being able to suppress a decrease in the color optical density by a plasticizer or the like, and improving print storage stability, in particular, plasticizer resistance. The configuration in which the content of the urea-urethane compound is 20 mass % or less is preferable from the viewpoint of preventing a decline in chromogenic properties (a decrease in optical density).

In the present embodiment, the heat-sensitive recording layer 3 comprises a urea-urethane compound represented by formula (4), the content ratio of the urea-urethane compound represented by formula (4) to the non-phenol-based developer (urea-urethane compound/non-phenol-based developer) is preferably 1/20 to 1/1. The configuration in which the content ratio is 1/1 or less is preferable from the viewpoint of being able to prevent a decline in chromogenic properties (a decrease in optical density). The configuration in which the content ratio is 1/20 or more is preferable from the viewpoint of being able to suppress a decrease in the color optical density by a plasticizer or the like, and improving print storage stability, in particular, plasticizer resistance.

In the present embodiment, the content of the urea-urethane compound represented by formula (4) with respect to the total amount of the storage stability improver contained in the heat-sensitive recording layer 3 is not limited, but is preferably 90 mass % or more, more preferably 95 mass % or more, and further more preferably 99 mass % or more, from the viewpoint of being able to suppress a decrease in the color optical density by a plasticizer or the like, and improving print storage stability, in particular, plasticizer resistance.

In the present embodiment, the heat-sensitive recording medium 1 excellent in water resistance, chemical resistance, plasticizer resistance and the like can be obtained by providing an intermediate layer 4 on the heat-sensitive recording layer 3.

Examples of the material for forming the intermediate layer 4 include water-based resins of polyvinyl alcohol, modified polyvinyl alcohol, starch, modified starch, casein, gelatin, glue, gum arabic, polyamide, polyacrylamide, modified polyacrylamide, hydroxyethylcellulose, methylcellulose, carboxymethylcellulose, hydroxypropylcellulose, polyvinyl acetate, polyacrylic acid esters, styrene-maleic anhydride copolymers, isobutylene-maleic anhydride copolymers, diisobutylene-maleic anhydride copolymers, vinyl acetate-maleic anhydride copolymers, methylvinyl-maleic anhydride copolymers, isopropylene-maleic anhydride copolymers, styrene-butadiene copolymers, maleic acid copolymers, polyvinyl chloride, polyvinylidene chloride, vinyl chloride-vinyl acetate copolymers, polyurethane, polystyrene, polyvinylpyrrolidone, acrylic acid esters, acrylonitrile, methylvinyl ether polyvinyl alcohol and the like. The term "water-based resin" means a resin component in which any of these compounds is dispersed in water or dissolved in water. These materials can be used alone, or in combination of two or more thereof.

By using, as the above-described resin, a resin having a water-soluble moiety, for example, a polyvinyl alcohol (PVA) resin which is a resin having a hydroxy group as a hydrophilic structural unit, or a resin of core-shell structure in which hydrophobic core particles are coated with a water-soluble shell polymer, for example, a core-shell-type acrylic resin, transparency can be improved.

As the core-shell-type resin, for example, a core-shell-type acrylic resin that is sold under the name of "BARRIERSTAR" (manufactured by Mitsui Chemicals, Inc.) can be used.

The application amount (dry weight) of the intermediate layer 4 is preferably 0.3 $g/m^2$ to 10 $g/m^2$.

The topcoat layer 5 improves thermal head compatibility of the heat-sensitive recording medium 1 with a thermal head, so that the heat-sensitive recording layer 3 successfully develops a color. Specifically, the heat-sensitive recording layer 3 develops a color in such a manner as to minimize occurrence of defects such as deposition of fouling on the thermal head and distortion of the surface of the heat-sensitive recording medium 1 by heat.

In the present embodiment, the topcoat layer 5 of the heat-sensitive recording medium 1 plays a role of preventing the shortening of the life of the thermal head by reducing the wear of the thermal head without addition of elastic particles or the like. This means what is called improvement of thermal head compatibility. For the topcoat layer 5, it is necessary to improve sticking resistance with respect to the thermal head. Here, the sticking resistance means that defects caused because a component of the uppermost layer of the heat-sensitive recording medium is melted by heat from the thermal head, and adheres to the thermal head are unlikely to occur. More specifically, defects such as partial failure to perform printing on the heat-sensitive recording medium, and distortion of the print surface are unlikely to occur.

The topcoat layer 5 according to the present embodiment has, on a surface thereof, evaporation holes resulting from evaporation of moisture and cracks, as downwardly protruding recessed portions. This reduces the contact area between the surface of the topcoat layer 5 and the thermal head.

For generating recessed portions, in particular, cracks on the surface of the topcoat layer 5 as described above, a coating liquid containing hydrophobic resin particles is used as a coating liquid for forming the topcoat layer 5.

That is, in the present embodiment, the topcoat layer 5 comprises, as a binder, an emulsion of hydrophobic resin particles, for example, an emulsion obtained by dispersing hydrophobic acrylic resin particles in water.

Thus, as the binder of the topcoat layer 5, an emulsion of hydrophobic resin particles is used, and a water-soluble polymer is not used.

For the coating liquid containing a water-soluble polymer, aggregation is unlikely to occur during application and drying, and a flexible coating film is formed, so that cracks resulting from shrinkage of the topcoat layer 5 are not generated.

On the other hand, for the emulsion of hydrophobic resin particles, hydrophobic resin particles are aggregated by evaporation to shrink during application and drying, so that cracks as recessed portion are generated on the surface of the topcoat layer 5.

The cracks, which are formed by aggregation and resultant shrinkage of hydrophobic resin particles, thus end at the topcoat layer 5, and do not reach the intermediate layer 4.

In the present embodiment, for forming, on the surface of the topcoat layer 5, evaporation holes resulting from evaporation of moisture as recessed portions, three layers which are the heat-sensitive recording layer 3, the intermediate layer 4 and the topcoat layer 5 are formed by three-layer simultaneous application using a curtain coater.

In the curtain coater, coating liquids for forming the heat-sensitive recording layer 3, the intermediate layer 4 and the topcoat layer 5, respectively, are discharged, respectively, from a plurality of slits, and layered, and the layered coating liquid is continuously run. At this time, the coating liquid is applied in free fall onto the undercoat layer 6 formed on the substrate 2 in advance.

In this three-layer simultaneous application using a curtain coater, drying of the topcoat layer 5 initiates aggregation of hydrophobic resin particles to generate cracks as described above. Water vapor exits through the cracks, so that the half-dry intermediate layer 4 and heat-sensitive recording layer 3 dry and solidify. The water vapor of the intermediate layer 4 and the heat-sensitive recording layer 3 is mostly released through the cracks, but a part of the water vapor is released with evaporation holes formed in the topcoat layer 5. Therefore, cracks and evaporation holes are formed near the topcoat layer 5.

In the present embodiment, the evaporation holes formed in the topcoat layer 5 end at the intermediate layer 4. Therefore, even if oil or the like adheres to the surface of the topcoat layer 5 which is an outermost layer, the oil or the like does not reach the heat-sensitive recording layer 3, and discoloration and the like of the heat-sensitive recording layer 3 do not occur.

The topcoat layer 5 comprises additives such as a slipping agent, a crosslinker, a dispersant, a defoaming agent, a water resistant additive and a filler as necessary.

Examples of the slipping agent include polyethylene, and zinc stearate. Examples of the crosslinker include zirconium carbonate.

Examples of the filler include aluminum hydroxide, aluminum oxide, aluminum silicate, heavy calcium carbonate, light calcium carbonate, titanium oxide, barium sulfate, silica gel, activated white earth, talc, clay, kaolinite, diatomaceous earth, white carbon, magnesium carbonate, magnesium oxide, magnesium hydroxide, zinc oxide, polystyrene resin particles, urea-formalin resin particles, and polyolefin resin particles. These fillers can be used alone, or in combination of two or more thereof. The particle diameter of the filler contained in the topcoat layer 5 is preferably 1.0 μm or less.

In the present embodiment, the heat-sensitive recording medium 1 is produced using, as a coating liquid for forming the topcoat layer 5, a water-dispersible suspension in which an emulsion obtained by dispersing hydrophobic acrylic resin particles in water, polystyrene wax as a slipping agent and calcium carbonate as a pigment are blended at a mass ratio of 4:3:3 on a dry basis.

The application amount (dry weight) of the topcoat layer 5 is 1 $g/m^2$.

In this embodiment, as described above, cracks and moisture evaporation holes as recessed portions are formed on the surface of the topcoat layer 5 which is an outermost layer of the heat-sensitive recording medium 1, and therefore the surface of the topcoat layer 5 is irregular. This leads to a decrease in contact area between the topcoat layer 5 and the thermal head, so that wear of the thermal head is reduced to improve thermal head compatibility, and sticking resistance is improved.

The thickness of the topcoat layer 5 is adjusted to, for example, less than 1 μm. In the present embodiment, the thickness is adjusted to about 0.8 μm. This leads to a decreased distance between the surface of the topcoat layer 5 and the heat-sensitive recording layer 3, so that heat from the thermal head is efficiently conducted to the heat-sensitive recording layer 3. The decreased thickness contributes to cost reduction.

Further, since the cracks on the surface of the topcoat layer 5 spread inward in the thickness direction, the cracks provide discontinuity in a direction orthogonally crossing the thickness direction of the topcoat layer 5, that is, a lateral direction. By this, heat from the thermal head is inhibited from being released in the lateral direction. As a result, heat from the thermal head is efficiently conducted to the underlying heat-sensitive recording layer 3 located in the thickness direction.

The average diameter of moisture evaporation holes having a substantially circular shape is preferably 2 μm or more for decreasing the contact area between the topcoat layer 5 and the thermal head.

The average diameter of the evaporation holes is calculated by observing the surface of the topcoat layer 5 with an electron microscope (SEM), and measuring the diameter of evaporation holes per unit area, for example, 1 $mm^2$. The number of evaporation holes, for example, evaporation holes having an average diameter of 5 μm or more, is preferably 30 or more, and more preferably 40 or more.

In the heat-sensitive recording medium 1 according to the present embodiment, for example, a surface having a large number of evaporation holes and a small number of cracks can be obtained as the surface of the topcoat layer 5 by adjusting the formulation and the like of the topcoat layer 5. Alternatively, a surface having only a large number of evaporation holes without cracks can be obtained as the surface of the topcoat layer 5.

In the present embodiment, three layers which are the heat-sensitive recording layer 3, the intermediate layer 4 and the topcoat layer 5 are formed by multi-layer simultaneous application using a curtain coater, but the present invention is not limited to multi-layer simultaneous application, and the heat-sensitive recording layer 3, the intermediate layer 4 and the topcoat layer 5 may be individually formed in sequence.

In the present embodiment, the undercoat layer 6 and the intermediate layer 4 are formed on the substrate 2, but as another embodiment of the present invention, at least one of the undercoat layer 6 and the intermediate layer 4 may be omitted.

The heat-sensitive recording medium according to the present embodiment, which comprises a heat-sensitive recording layer having the above-described configuration, thus is excellent in light resistance, chromogenic properties and heat resistance.

The amount of change in whiteness (%) of the heat-sensitive recording medium according to the present embodiment, which is given by the following equation, is preferably −5% or more, more preferably −4.5% or more, and further more preferably −4% or more, from the viewpoint of obtaining excellent light resistance and suppressing a decrease in whiteness due to light irradiation.

Amount of change in whiteness (%)=whiteness after standing at an illuminance of 5,000 Lux for 100 hours−whiteness before test The whiteness is determined according to JIS P 8148.

The minus (−) before the amount of change in whiteness (%) indicates an amount of decrease in whiteness, and becomes closer to 0 as the decrease in whiteness becomes smaller and light resistance is improved.

The absolute value of Δb of the heat-sensitive recording medium according to the present embodiment, which is given by the following equation, is preferably 2.3 or less, more preferably 2.2 or less, further more preferably 2.1 or less, and particularly preferably 2 or less, from the viewpoint of obtaining excellent light resistance and suppressing a change into yellow or a change into blue (bluing) due to light irradiation.

Δb=b value after standing at a luminance of 5,000 Lux for 100 hours−b value before test The b value represents a chromaticity (b value) in the L*a*b* color space defined in JIS Z8781-4:2013

The b value indicates a change from blue to yellow, where the color becomes closer to yellow as the b value increases, and the color becomes closer to blue as the b value decreases. The Δb indicates an amount of change in b value, where the plus indicates a change into yellow and the minus indicates a change into blue. Therefore, the change into yellow or the change into blue becomes smaller and light resistance is improved as the absolute value of Δb becomes closer to 0.

The dynamic sensitivity (OD value) at 0.16 mj/dot of the print portion of the heat-sensitive recording medium according to the present embodiment is preferably 0.5 or more, and more preferably 0.6 or more, from the viewpoint of obtaining excellent chromogenic properties.

The dynamic sensitivity (OD value) at 0.20 mj/dot of the print portion of the heat-sensitive recording medium according to the present embodiment is preferably 1 or more, and more preferably 1.1 or more, from the viewpoint of obtaining excellent chromogenic properties.

The dynamic sensitivity (OD value) at 0.40 mj/dot of the print portion of the heat-sensitive recording medium according to the present embodiment is preferably 1.3 or more, and more preferably 1.4 or more, from the viewpoint of obtaining excellent chromogenic properties.

The dynamic sensitivity (OD value) is measured in Examples shown below, and increases as chromogenic properties are improved.

The OD value of the non-print portion of the heat-sensitive recording medium according to the present embodiment in Examples (evaluation of heat resistance) shown below is preferably 0.2 or less, more preferably 0.18 or less, and further more preferably 0.15 or less, from the viewpoint of obtaining excellent heat resistance, so that the print portion can be clearly identified even after cooking in a microwave oven or the like.

EXAMPLES

In each of Examples and Comparative Examples below, a heat-sensitive recording medium comprising a non-phenol-based developer and a non-phenol-based ultraviolet absorber in a heat-sensitive recording layer was prepared, and its chromogenic properties, light resistance and heat resistance were evaluated. Note that the present invention is not limited to these Examples.

Examples 1 to 6 and Comparative Examples 1 to 3

(Preparation of Heat-Sensitive Recording Medium)

<Undercoat Layer>

A coating liquid for an undercoat layer which had been obtained by mixing and stirring a composition comprising 70 parts by mass of hollow particles (solid content concentration 26.5%, ROPAQUE HP-1055: Rohm And Haas Japan K.K.), 10 parts by mass of modified styrene butadiene latex (solid content concentration 49%) and 20 parts by mass of water was applied onto high-quality paper (thickness: 80 μm) having a weight per unit area of 70 g/$m^2$ and serving as a substrate, and dried to form thereon a 5 μm-thick undercoat layer in an application amount of 3.0 g/$m^2$ on a dry basis.

<Heat-Sensitive Recording Layer>

Coating liquids for forming a heat-sensitive recording layer, which are shown in Table 1, were prepared. The prepared coating liquid for forming a heat-sensitive recording layer was applied onto the undercoat layer such that the application amount was 4.0 g/$m^2$ on a dry weight basis, and drying was then performed to form a 3.5 μm-thick heat-sensitive recording layer on the undercoat layer. In Table 1, values for the materials blended indicate weight ratios on a dry basis.

As the materials blended, 3-dibutylamino-6-methyl-7-anilinofluofluorane having a particle diameter of 0.6 to 0.7 μm was used as a leuco dye, [3-(3-phenylureido)phenyl]-4-methylbenzene sulfonate represented by the formula (2b) was used as a developer 1, and N,N'-di-[3-(p-toluenesulfonyloxy)phenyl]urea represented by the formula (1b) was used as a developer 2. As the ultraviolet absorber 1, N-(2-ethoxyphenyl)-N'-(2-ethylphenyl) ethanediamide (manufactured by Songwon Industrial) belonging to an oxanilide type was used, and as the ultraviolet absorber 2, α-3-(3-(2H-benzotriazol-2-yl)-5-tertiary-butyl-4-hydroxyphenyl)-1-oxopropyl-ω-hydroxy poly(oxyethylene) belonging to a benzotriazole type (phenol type) was used.

In addition, 1,2-bis(3-methylphenoxy)ethane (in the form of a dispersion obtained by dispersion in an aqueous PVA solution to a solid content concentration of 20%) was used as a sensitizer, a styrene acrylic copolymer emulsion was used as a binder, calcium carbonate (in the form of a dispersion obtained by dispersion in a 5% aqueous solution of sodium hexametaphosphate to a solid content concentration of 30%) was used as a pigment, and a zinc stearate emulsion was used as a slipping agent.

<Intermediate Layer>

An acrylic emulsion (solid content concentration 30%) liquid was applied onto the heat-sensitive recording layer, and dried to form thereon a 1.5 μm-thick intermediate layer in an application amount of 1.6 g/$m^2$ on a dry basis.

<Topcoat Layer>

A liquid obtained by mixing and stirring 40 parts by mass of an acrylic emulsion (solid content concentration 20%), 5 parts by mass of calcium carbonate, 15 parts by mass of polyethylene wax (solid content concentration 40%) and 40 parts by mass of water was applied onto the intermediate layer, and dried to form thereon a 0.9 μm-thick topcoat layer in an application amount of 1.0 g/$m^2$ on a dry basis.

By the above methods, heat-sensitive recording media of Examples 1 to 6 and Comparative Examples 1 to 3 were prepared.

TABLE 1

| | | Example | | | | Comparative Example | | Example | | Comparative Example |
|---|---|---|---|---|---|---|---|---|---|---|
| | | 1 | 2 | 3 | 4 | 1 | 2 | 5 | 6 | 3 |
| Heat-sensitive recording layer | Leuco dye | 17 | 16.3 | 15.7 | 14.4 | 18.3 | 15.7 | 17 | 15.7 | 18.3 |
| | Developer 1 | 36 | 34.7 | 33.2 | 30.5 | 38.8 | 33.2 | — | — | — |
| | Developer 2 | — | — | — | — | — | — | 36 | 33.2 | 38.8 |
| | Ultraviolet absorber 1 | 5 | 7.5 | 10 | 15 | — | — | 5 | 10 | — |
| | Ultraviolet absorber 2 | — | — | — | — | — | 10 | — | — | — |
| | Sensitizer | 12 | 11.5 | 11.1 | 10.1 | 12.9 | 11.1 | 12 | 11.1 | 12.9 |
| | Binder | 13 | 13 | 13 | 13 | 13 | 13 | 13 | 13 | 13 |
| | Pigment | 15 | 15 | 15 | 15 | 15 | 15 | 15 | 15 | 15 |
| | Slipping agent | 2 | 2 | 2 | 2 | 2 | 2 | 2 | 2 | 2 |

(Evaluation of Light Resistance)

In evaluation of light resistance, an optical density (OD value of print portion/OD value of non-print portion), a change into yellow (yellowing) and a change in whiteness were each measured for the print portions and non-print portions of the heat-sensitive recording media of Examples and Comparative Examples. Hereinafter, the procedure of evaluation of light resistance will be described.

Printing was performed on the prepared heat-sensitive recording medium under a condition of a printing energy of 0.40 mJ/dot using a heat-sensitive paper printing test apparatus (manufactured by Okura Engineering Co. Ltd., brand name: Pulse Simulator TH-M2/PP), where the printing rate was set to 50 mm/sec, the applied voltage was set to 17.0 V, the head resistance value was set to 870Ω and the pulse width was set to 0.488 to 1.394 ms.

Using an illuminometer, a distance from a fluorescent lamp was so as to ensure 5,000 Lux. At the corresponding location, the heat-sensitive recording medium printed as described above is left to stand for 100 hours.

The optical density of each of the print portion and the non-print portion (OD value of print portion/OD value of non-print portion) in a sample of the heat-sensitive recording medium before the test and after the standing was measured using a spectrophotometer (manufactured by Videojet X-Rite K.K., brand name: exact).

The whiteness (%) and the hue (L, a, b) in a sample of the heat-sensitive recording medium before the test and the standing were measured. The whiteness was measured according to JIS P 8148 using a Photovolt type reflection densitometer (manufactured by TokyoDenshoku. Co., Ltd., brand name: TC-6DS/A).

The hue (L, a, b) was measured using a color difference meter (manufactured by Videojet X-Rite K.K., brand name: SpectroEye).

Table 2 shows the results of measurement in the test. In the measurement results in Table 2, the optical density (OD value) in the print portion and the non-print portion indicates higher color development (the colored state becomes closer to black) in the case of a large value (that is, a low light reflectance), and insufficient color development in the case of a small value (that is, a high light reflectance). The whiteness (%) indicates that the color becomes closer to white as the value increases. Among the indices of the hue (L, a, b), (L) indicates a change from black to white, and the color becomes closer to white as the value of (L) increases. (a) indicates a change from green to red, and the color becomes closer to red as the value of (a) increases. (b) indicates a change from blue to yellow, and the color becomes closer to yellow as the value of (b) increases. From these changes in color, the light resistance of each heat-sensitive recording medium was evaluated.

(Evaluation of Dynamic Sensitivity)

In the dynamic sensitivity test, printing was performed on the heat-sensitive recording media of Examples and Comparative Examples while the printing energy was changed, and the optical density (OD value of print portion) at each printing energy was measured. From the results of the measurement, the dynamic sensitivity of the heat-sensitive recording medium in each of Examples and Comparative Examples was evaluated. Hereinafter, the procedure of the dynamic sensitivity test will be described.

Printing was performed on the prepared heat-sensitive recording medium under conditions of printing energies of 0.16 mJ/dot, 0.20 mJ/dot and 0.40 mJ/dot using a heat-sensitive paper printing test apparatus (manufactured by Okura Engineering Co. Ltd., brand name: Pulse Simulator TH-M2/PP), where the printing rate was set to 50 mm/sec, the applied voltage was set to 17.0 V, the head resistance value was set to 870Ω and the pulse width was set to 0.488 to 1.394 ms. The optical density (OD value) under the relevant printing energy condition was measured using a spectrophotometer (manufactured by Videojet X-Rite K.K., brand name: exact).

Table 2 shows the results of measurement in the test. Similarly to the light resistance test, the measurement results in Table 2 show that higher color development occurs in the case where the value of the optical density (OD value) is large, and color development is insufficient in the case where the value is small. For example, a sample in which the printing energy is small, but the value of the optical density (OD value) is large is evaluated as having "good chromogenic properties". On the other hand, a sample in which the printing energy is large, but the value of the optical density (OD value) is small is evaluated as having "poor chromogenic properties". In other words, the dynamic sensitivity test is evaluation of chromogenic properties.

(Evaluation of Heat Resistance)

In the heat resistance test, heat was applied to the print portion and the non-print portion of the heat-sensitive recording medium in each of Examples and Comparative Examples, and the optical density of the print portion and the non-print portion (OD value of print portion) was measured. From the results of the measurement, the heat resistance of the heat-sensitive recording medium in each of Examples and Comparative Examples was evaluated. Hereinafter, the procedure of the heat resistance test will be described.

Printing was performed on the prepared heat-sensitive recording medium under a condition of a printing energy of 0.40 mJ/dot using a heat-sensitive paper printing test apparatus (manufactured by Okura Engineering Co. Ltd., brand name: Pulse Simulator TH-M2/PP), where the printing rate was set to 50 mm/sec, the applied voltage was set to 17.0 V, the head resistance value was set to 870Ω and the pulse width was set to 0.488 to 1.394 ms.

A container (diameter: 12 cm, internal volume: 220 cc) containing 100 g of water is covered with a plastic wrap made of vinyl chloride (thickness: 10 μm), and a sample of the heat-sensitive recording medium (3 cm in length and 4 cm in width) printed as described above was attached onto the wrap.

Next, 10 through-holes were formed in the plastic wrap with a safety pin so that water vapor exited during heating. The through-holes were formed in such a manner that the sample portion was avoided, and the distances between the through-holes were equal.

Next, the container was heated in a microwave oven (1,500 W) for 1 minute, and the optical density of each of the print portion and the non-print portion (OD value of print portion/OD value of non-print portion) in the sample of the heat-sensitive recording medium was then measured using a spectrophotometer (manufactured by Videojet X-Rite K.K., brand name: exact).

Table 2 shows the results of measurement in the test. In the evaluation of heat resistance, when the value of the optical density (OD value) is small in the non-print portion and large in the print portion, the reaction of the heat-sensitive recording medium to heat is low. That is, the degree of color development of the print portion or the non-print portion when the heat-sensitive recording medium is heated in a microwave oven and heat from vapor is applied to the heat-sensitive recording medium is presented. For this reason, the non-print portion preferably develops a color as little as possible, and thus can be evaluated as "having good heat resistance" in the case where the value of the optical density (OD value) is small. On the other hand, for the print portion, it is confirmed that the colored portion is not erased by heat from vapor. Specifically, the print portion, where the value of the optical density (OD value) is large, hardly reacts to heat.

TABLE 2

| | | | Example | | | | Comparative Example | | Example | | Comparative Example |
|---|---|---|---|---|---|---|---|---|---|---|---|
| | | | 1 | 2 | 3 | 4 | 1 | 2 | 5 | 6 | 3 |
| Light resistance | Before test | OD value* | 1.52/0.04 | 1.51/0.04 | 1.50/0.04 | 1.49/0.05 | 1.50/0.04 | 1.56/0.05 | 1.52/0.06 | 1.51/0.05 | 1.53/0.05 |
| | | Whiteness (%) | 85.3 | 85.2 | 85.4 | 84.4 | 85.3 | 81 | 84.2 | 84.2 | 83.9 |
| | | L | 96.36 | 96.25 | 96.39 | 94.19 | 96.19 | 95.37 | 95.34 | 95.54 | 95.17 |
| | | a | −0.54 | −0.5 | −0.49 | −0.78 | −0.47 | −0.96 | −0.22 | −0.20 | −0.24 |
| | | b | 1.08 | 1.1 | 1.05 | 0.80 | 1.15 | 2.34 | 1.35 | 1.23 | 1.31 |

TABLE 2-continued

| | | Example | | | | Comparative Example | | Example | | Comparative Example |
|---|---|---|---|---|---|---|---|---|---|---|
| | | 1 | 2 | 3 | 4 | 1 | 2 | 5 | 6 | 3 |
| 5000 Lux after 100 hr | OD value* | 1.49/0.05 | 1.48/0.05 | 1.48/0.05 | 1.45/0.06 | 1.48/0.05 | 1.53/0.07 | 1.47/0.06 | 1.5/0.05 | 1.51/0.06 |
| | Whiteness (%) | 80.8 | 81.3 | 81.0 | 81.0 | 79.9 | 77.4 | 83.7 | 84.1 | 83.0 |
| | L | 95.4 | 95.44 | 95.46 | 95.29 | 95.23 | 94.09 | 95.15 | 95.14 | 94.33 |
| | a | 0.02 | −0.01 | −0.01 | −0.01 | 0.05 | −0.41 | 0.13 | 0.03 | 0.02 |
| | b | 3.27 | 3.00 | 3.08 | 3.21 | 3.56 | 2.54 | 0.51 | 0.41 | 0.54 |
| Color difference | Amount of change in whiteness (%) | −4.50 | −3.90 | −4.40 | −3.40 | −5.40 | −3.60 | −0.50 | −0.10 | −0.90 |
| | Δ b | 2.19 | 1.90 | 2.03 | 2.41 | 2.41 | 0.20 | −0.84 | −0.82 | −0.77 |
| Dynamic sensitivity (OD value) | 0.16 mj/dot | 0.64 | 0.62 | 0.62 | 0.58 | 0.62 | 0.58 | 0.90 | 0.76 | 0.84 |
| | 0.20 mj/dot | 1.21 | 1.18 | 1.15 | 1.16 | 1.18 | 1.20 | 1.37 | 1.30 | 1.38 |
| | 0.40 mj/dot | 1.56 | 1.55 | 1.56 | 1.50 | 1.56 | 1.55 | 1.45 | 1.42 | 1.50 |
| Heat resistance* | | 1.50/0.06 | 1.52/0.06 | 1.51/0.06 | 1.50/0.06 | 1.50/0.06 | 1.54/0.35 | 1.47/0.17 | 1.47/0.17 | 1.47/0.16 |

*(OD value of print portion)/(OD value of non-print portion)

<Verification Results>

The following was confirmed from the results shown in Table 2.

Examples 1 to 4 and Comparative Examples 1 and 2

Examples 1 to 4 and Comparative Examples 1 and 2 with the same developer 1 will be discussed.

(1) In the light resistance test, the amount of change in whiteness is smaller and the whiteness after the test is higher in Examples 1 to 4 than in Comparative Example 1. This may be because of the incorporation of an ultraviolet absorber 1 (non-phenol-based ultraviolet absorber) in Examples 1 to 4. On the other hand, the amount of change in whiteness in Comparative Example 2 with the same developer 1 as in Examples 1 to 4 and an ultraviolet absorber 2 (phenol-based ultraviolet absorber) different from the ultraviolet absorber in Examples 1 to 4 was-3.60. This is smaller than the amount of change in whiteness in Examples 1 to 3. Therefore, Examples 1 to 3 appear to be inferior in light resistance to Comparative Example 2. That is, it appears that when the heat-sensitive recording layer contains a phenol-based ultraviolet absorber that has been commonly used heretofore, better light resistance is exhibited.

However, the whiteness after the test in Comparative Example 2 is 77.4%, and obviously smaller than the whiteness in Examples 1 to 4. Concerning the difference in amount of change in whiteness, the differences in amount of change in whiteness between Examples 1 to 3 and Comparative Example 2 were as small as 0.90, 0.30 and 0.80, respectively. Therefore, it can be said that the level of change in whiteness is equivalent to that in Comparative Example 2 even when a non-phenol-based ultraviolet absorber is contained. Moreover, the result of comparison between Example 4 and Comparative Example 2 showed that the amount of change in whiteness was smaller in Example 4. This indicates that at least, Example 4 is superior in light resistance to Comparative Example 2.

Further, there was no significant difference in optical density (OD value) after the test between Examples 1 to 4 and Comparative Examples 1 and 2.

From these facts, the heat-sensitive recording media of Examples 1 to 4 with a non-phenol-based ultraviolet absorber were confirmed to be comparable in light resistance to Comparative Example 2 with the phenol-based ultraviolet absorber 2. It was confirmed that light resistance better than that of a heat-sensitive recording medium containing a phenol-based ultraviolet absorber was obtained by adjusting the content of a non-phenol-based ultraviolet absorber as shown in Example 4.

(2) In the dynamic sensitivity test (chromogenic properties), when the printing energy was set to 0.40 mJ/dot, the optical density (OD value) in Examples 1 to 3 and Comparative Examples 1 and 2 was 1.55 or 1.56, whereas in Example 4, a smaller optical density (OD value) of 1.50 was exhibited. However, when the printing energy is set to 0.16 mJ/dot or 0.20 mJ/dot, there was no significant difference in optical density (OD value) between Examples 1 to 4 and Examples 1 and 2.

From these facts, the heat-sensitive recording media of Examples 1 to 4 with a non-phenol-based ultraviolet absorber were confirmed to be comparable and never inferior in chromogenic properties to Comparative Example 2 with a phenol-based ultraviolet absorber.

(3) In the heat resistance test, the optical density (OD value) of the print portion and the optical density (OD value) of the non-print portion in Examples 1 to 4 were 1.50 to 1.52 and 0.06, respectively. The optical density (OD value) of the print portion and the optical density (OD value) of the non-print portion in Comparative Example 1 were 1.50 and 0.06, respectively, and equivalent to those in Examples 1 to 4. On the other hand, the optical density (OD value) of the print portion and the optical density (OD value) of the non-print portion were 1.54 and 0.35, respectively, and larger than those in Examples 1 to 4. In particular, the optical density (OD value) of the non-print portion in Comparative Example 2 was significantly larger than the optical density (OD value) of the non-print portion in Examples 1 to 4. As described above, in the heat resistance test, it can be determined that better heat resistance is exhibited when the optical density (OD value) of the non-print portion is smaller. Therefore, at least, it can be said that the non-print portion in Examples 1 to 4 is superior in heat resistance to the non-print portion in Comparative Example 2.

From these facts, the heat-sensitive recording media of Examples 1 to 4 with a non-phenol-based ultraviolet absorber were confirmed to be comparable in heat resistance to Comparative Example without any ultraviolet absorber.

Further, the heat-sensitive recording media of Examples 1 to 4 were confirmed to be obviously superior in heat resistance to the heat-sensitive recording medium of Comparative Example 2 with the phenol-based ultraviolet absorber.

Examples 5 to 6 and Comparative Example 3

Examples 5 to 6 and Comparative Example 3 with the same developer 2 will be discussed.

(4) In the light resistance test, the amount of change in whiteness was smaller in Examples 5 to 6 than in Comparative Example 3. In addition, the whiteness after the test was larger in Examples 4 to 6 than in Comparative Example 3. From these facts, Examples 5 to 6 with a non-phenol-based ultraviolet absorber were confirmed to be more effective in suppression of a decrease in whiteness than Comparative Example 3 without an ultraviolet absorber.

(5) In the dynamic sensitivity test, Example 5 and Comparative Example 3 were comparable in optical density (OD value) at each printing energy. The optical density (OD value) tended to be lower in Example 6 than in Comparative Example 3. However, in Example 6, there was just a 5 to 10% decrease, and chromogenic properties enabling successful use as a heat-sensitive recording medium were exhibited.

From these facts, Examples 5 and 6 were confirmed to be comparable in chromogenic properties to Comparative Example 3 without an ultraviolet absorber even though a non-phenol-based ultraviolet absorber was contained.

(6) In the heat resistance test, Examples 5 and 6 and Comparative Example 3 were equal in optical density (OD value) of the print portion and optical density (OD value) of the non-print portion.

From this fact, Examples 5 and 6 were confirmed to be never inferior in heat resistance to Comparative Example 3 without an ultraviolet absorber even though a non-phenol-based ultraviolet absorber was contained.

[Conclusions]

From the measurement results described above, heat-sensitive recording media containing a non-phenol-based developer and a non-phenol-based ultraviolet absorber were not confirmed to be inferior in light resistance, chromogenic properties and heat resistance to heat-sensitive recording media containing a phenol-based ultraviolet absorber. It was found that when the heat-sensitive recording medium contained a non-phenol-based ultraviolet absorber, an effect of improving light resistance while maintaining good heat resistance of the heat-sensitive recording medium was exhibited, and it was possible to suppress a decrease in whiteness and a change into yellow.

Further, the non-phenol-based developer and the non-phenol-based ultraviolet absorber were superior in safety to phenol-based counterparts. Therefore, the use of a non-phenol-based developer and a non-phenol-based ultraviolet absorber was very effective from the viewpoint of environmental compatibility.

Hereinafter, the variations of the present invention will be appended.

Appended Item 1

A heat-sensitive recording medium in which a heat-sensitive recording layer is layered on a substrate, the heat-sensitive recording layer comprising a color former, a non-phenol-based developer and a non-phenol-based ultraviolet absorber, the non-phenol-based ultraviolet absorber comprising an oxanilide-based ultraviolet absorber.

Appended Item 2

The heat-sensitive recording medium according to appended item 1, wherein the non-phenol-based developer comprises a compound represented by the following formula (1) and/or a compound represented by the following formula (2):

[Formula 16]

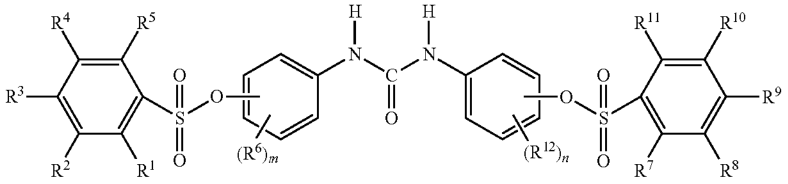

(1)

wherein $R^1$, $R^2$, $R^3$, $R^4$, $R^5$, $R^7$, $R^8$, $R^9$, $R^{10}$ and $R^{11}$ each independently represent a hydrogen atom, or a substituent; $R^6$ and $R^{12}$ each independently represent a substituent; m represents an integer of 0 to 4; when m is 2 or more, a plurality of $R^6$ is the same or different; n represents an integer of 0 to 4; and when n is 2 or more, a plurality of $R^{12}$ is the same or different,

[Formula 17]

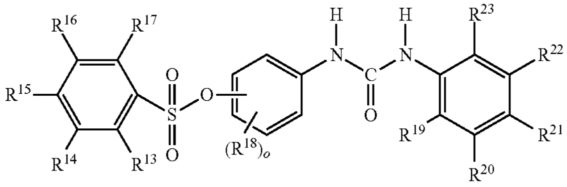

(2)

wherein $R^{13}$, $R^{14}$, $R^{15}$, $R^{16}$, $R^{17}$, $R^{19}$, $R^{20}$, $R^{21}$, $R^{22}$ and $R^{23}$ each independently represent a hydrogen atom, or a substituent; $R^{18}$ represents a substituent; o represents an integer of 0 to 4; and when o is 2 or more, a plurality of $R^{18}$ is the same or different.

Appended Item 3

The heat-sensitive recording medium according to appended item 1 or 2, wherein the non-phenol-based developer comprises a compound represented by the following formula (1a) and/or a compound represented by the following formula (2a):

[Formula 18]

(1a)

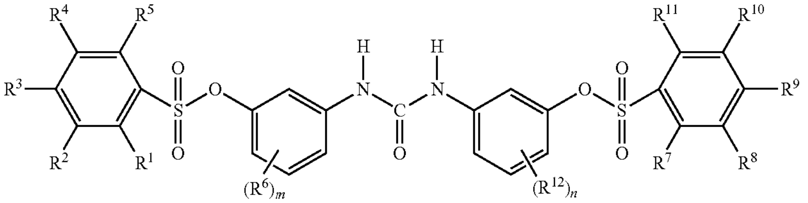

wherein the symbols are the same as in formula (1),

[Formula 19]

(2a)

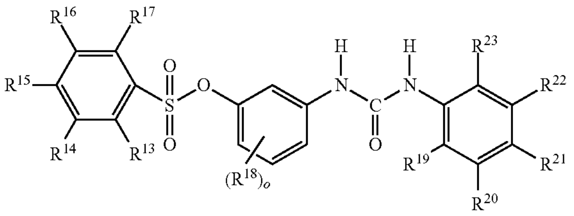

wherein the symbols are the same as in formula (2).

Appended Item 4

The heat-sensitive recording medium according to any one of appended items 1 to 3, wherein a content of the non-phenol-based developer is not less than 10 mass % and not more than 50 mass % with respect to an entirety of the heat-sensitive recording layer.

Appended Item 5

The heat-sensitive recording medium according to any one of appended items 1 to 4, wherein a content of the non-phenol-based ultraviolet absorber is not less than 5 mass % and not more than 15 mass % with respect to an entirety of the heat-sensitive recording layer.

INDUSTRIAL APPLICABILITY

As described above, the present invention is particularly useful for heat-sensitive recording media printed with a barcode or the like.

REFERENCE SIGNS LIST

1 Heat-sensitive recording medium
2 Substrate
3 Heat-sensitive recording layer
4 Intermediate layer
5 Topcoat layer
6 Undercoat layer

The invention claimed is:

1. A heat-sensitive recording medium in which a heat-sensitive recording layer is layered on a substrate, the heat-sensitive recording layer comprising a color former, a non-phenol-based developer and a non-phenol-based ultraviolet absorber, the non-phenol-based ultraviolet absorber comprising an oxanilide-based ultraviolet absorber, wherein the non-phenol-based developer comprises a compound represented by the following formula (1) and/or a compound represented by the following formula (2):

[Formula 1]

(1)

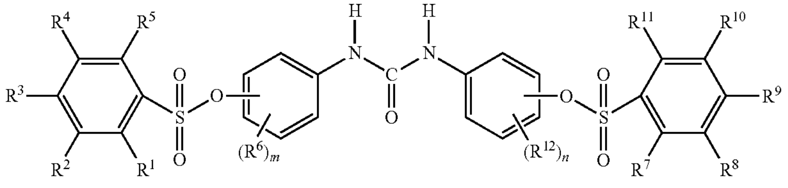

wherein:

$R^1$, $R^2$, $R^3$, $R^4$, $R^5$, $R^7$, $R^8$, $R^9$, $R^{10}$ and $R^{11}$ each independently represent a hydrogen atom, a halogen atom, a nitro group, an amino group, an alkyl group, an alkoxy group, an aryl group, an aryloxy group, an alkylcarbonyloxy group, an alkylcarbonylamino group, an arylcarbonylamino group, an alkylsulfonylamino group, an arylsulfonylamino group, a monoalkylamino group, a dialkylamino group, or an arylamino group;

$R^6$ and $R^{12}$ each independently represent a halogen atom, a nitro group, an amino group, an alkyl group, an alkoxy group, an aryl group, an aryloxy group, an alkylcarbonyloxy group, an alkylcarbonylamino group, an arylcarbonylamino group, an alkylsulfonylamino group, an arylsulfonylamino group, a monoalkylamino group, a dialkylamino group, or an arylamino group;

m represents an integer of 0 to 4;

when m is 2 or more, a plurality of $R^6$ is the same or different;

n represents an integer of 0 to 4; and when n is 2 or more, a plurality of $R^{12}$ is the same or different,

[Formula 2]

(2)

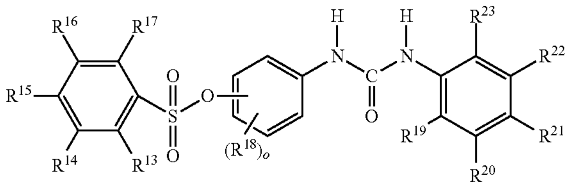

wherein:

$R^{13}$, $R^{14}$, $R^{15}$, $R^{16}$, $R^{17}$, $R^{19}$, $R^{20}$, $R^{21}$, $R^{22}$ and $R^{23}$ each independently represent a hydrogen atom, a halogen atom, a nitro group, an amino group, an alkyl group, an alkoxy group, an aryl group, an aryloxy group, an alkylcarbonyloxy group, an alkylcarbonylamino group, an arylcarbonylamino group, an alkylsulfonylamino group, an arylsulfonylamino group, a monoalkylamino group, a dialkylamino group, or an arylamino group;

$R^{18}$ represents a halogen atom, a nitro group, an amino group, an alkyl group, an alkoxy group, an aryl group, an aryloxy group, an alkylcarbonyloxy group, an alkylcarbonylamino group, an arylcarbonylamino group, an alkylsulfonylamino group, an arylsulfonylamino group, a monoalkylamino group, a dialkylamino group, or an arylamino group;

o represents an integer of 0 to 4; and when o is 2 or more, a plurality of $R^{18}$ is the same or different.

2. The heat-sensitive recording medium according to claim 1, wherein the non-phenol-based developer comprises a compound represented by the following formula (1a) and/or a compound represented by the following formula (2a):

[Formula 3]

(1a)

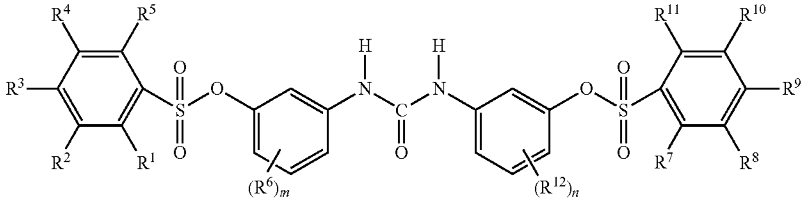

wherein:

$R^1$, $R^2$, $R^3$, $R^4$, $R^5$, $R^7$, $R^8$, $R^9$, $R^{10}$ and $R^{11}$ each independently represent a hydrogen atom, a halogen atom, a nitro group, an amino group, an alkyl group, an alkoxy group, an aryl group, an aryloxy group, an alkylcarbonyloxy group, an alkylcarbonylamino group, an arylcarbonylamino group, an alkylsulfonylamino group, an arylsulfonylamino group, a monoalkylamino group, a dialkylamino group, or an arylamino group;

$R^6$ and $R^{12}$ each independently represent a halogen atom, a nitro group, an amino group, an alkyl group, an alkoxy group, an aryl group, an aryloxy group, an alkylcarbonyloxy group, an alkylcarbonylamino group, an arylcarbonylamino group, an alkylsulfonylamino group, an arylsulfonylamino group, a monoalkylamino group, a dialkylamino group, or an arylamino group;

m represents an integer of 0 to 4;

when m is 2 or more, a plurality of $R^6$ is the same or different;

n represents an integer of 0 to 4; and when n is 2 or more, a plurality of $R^{12}$ is the same or different,

[Formula 4]

(2a)

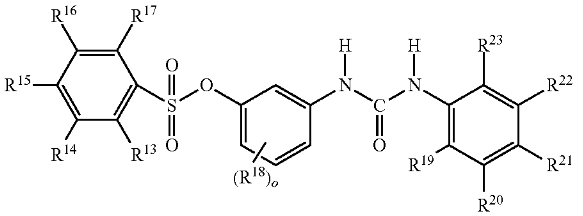

wherein:

$R^{13}$, $R^{14}$, $R^{15}$, $R^{16}$, $R^{17}$, $R^{19}$, $R^{20}$, $R^{21}$, $R^{22}$ and $R_{23}$ each independently represent a hydrogen atom, a halogen atom, a nitro group, an amino group, an alkyl group, an alkoxy group, an aryl group, an aryloxy group, an alkylcarbonyloxy group, an alkylcarbonylamino group, an arylcarbonylamino group, an alkylsulfonylamino group, an arylsulfonylamino group, a monoalkylamino group, a dialkylamino group, or an arylamino group;

$R^{18}$ represents a halogen atom, a nitro group, an amino group, an alkyl group, an alkoxy group, an aryl group, an aryloxy group, an alkylcarbonyloxy group, an alkylcarbonylamino group, an arylcarbonylamino group, an alkylsulfonylamino group, an arylsulfonylamino group, a monoalkylamino group, a dialkylamino group, or an arylamino group;

o represents an integer of 0 to 4; and when o is 2 or more, a plurality of $R^{18}$ is the same or different.

3. The heat-sensitive recording medium according to claim 1, wherein a content of the non-phenol-based developer is not less than 10 mass % and not more than 50 mass % with respect to an entirety of the heat-sensitive recording layer.

4. The heat-sensitive recording medium according to claim 1, wherein a content of the non-phenol-based ultraviolet absorber is not less than 5 mass % and not more than 15 mass % with respect to an entirety of the heat-sensitive recording layer.

5. The heat-sensitive recording medium according to claim 3, wherein a content of the non-phenol-based ultraviolet absorber is not less than 5 mass % and not more than 15 mass % with respect to the entirety of the heat-sensitive recording layer.

* * * * *